United States Patent [19]
Nishiumi et al.

[11] Patent Number: 6,166,121
[45] Date of Patent: Dec. 26, 2000

[54] CURABLE ORGANOPOLYSILOXANE COMPOSITION

[75] Inventors: Wataru Nishiumi; Seiji Hori, both of Chiba Prefecture, Japan

[73] Assignee: Dow Corning Toray Silicone Co., Ltd., Tokyo, Japan

[21] Appl. No.: 09/299,054

[22] Filed: Apr. 23, 1999

[30] Foreign Application Priority Data

Apr. 24, 1998 [JP] Japan .................................. 10-131376

[51] Int. Cl.$^7$ ...................................................... C08K 3/26

[52] U.S. Cl. .......................... 524/425; 524/270; 524/284; 524/588; 524/863; 524/864; 528/38; 556/482; 556/458; 549/215

[58] Field of Search ...................................... 524/425, 270, 524/284, 863, 588, 864; 528/38; 556/482, 458; 549/215

[56] References Cited

U.S. PATENT DOCUMENTS

| | | | |
|---|---|---|---|
| 4,985,476 | 1/1991 | Endres et al. ........................... | 523/210 |
| 5,302,648 | 4/1994 | Fujimoto et al. ....................... | 524/200 |
| 5,405,889 | 4/1995 | Hatanaka et al. . | |

FOREIGN PATENT DOCUMENTS 3-17158   3/1991   Japan .

*Primary Examiner*—Robert Dawson
*Assistant Examiner*—Kuo-Liang Peng
*Attorney, Agent, or Firm*—Patricia M. Scaduto

[57] ABSTRACT

A curable organopolysiloxane composition that can form a cured product that is strongly adhesive to substrates such as glasses, plastics, and metals and exhibits a very durable adhesion in which adhesiveness is maintained even under severe conditions such as immersion in hot water. The curable organopolysiloxane composition comprises from 1 to 75 weight % of a calcium carbonate powder whose surface has been treated with both (a) a rosin or a rosin derivative and (b) a fatty acid or a fatty acid derivative.

8 Claims, No Drawings

CURABLE ORGANOPOLYSILOXANE COMPOSITION

FIELD OF THE INVENTION

This invention relates to a curable organopolysiloxane composition. More particularly, this invention relates to a curable organopolysiloxane composition which can generate a cured product that is strongly adhesive to substrates such as glasses, plastics, and metals and that is capable of maintaining its adhesiveness even when used under severe conditions such as immersion in hot water.

BACKGROUND INFORMATION

Calcium carbonate powder is used as a reinforcing filler for curable organopolysiloxane compositions and is frequently used as a reinforcing filler for condensation reaction-curing organopolysiloxane compositions. A large number of calcium carbonate powder-filled curable organopolysiloxane compositions of this type are known. For example, Japanese Laid Open (Kokai or Unexamined) Patent Application Number Hei 3-17158 (17,158/1991) discloses a room temperature-curing organopolysiloxane composition filled with calcium carbonate powder whose surface has been treated with rosin acid. Japanese Laid Open (Kokai or Unexamined) Patent Application Number Hei 3-56581 (56,581/1991) discloses a two-package silicone sealant composition filled with calcium carbonate powder whose surface has been treated with the ester of a fatty acid.

The aforementioned compositions, however, are poorly adhesive to a variety of substrates, such as glasses, plastics, and metals, and give cured products that will gradually delaminate from the adherend during long-term standing under severe conditions such as immersion in hot water.

The object of the present invention is to provide a curable organopolysiloxane composition which can generate a cured product that is strongly adhesive to substrates such as glasses, plastics, and metals and that exhibits a very durable adhesion in which adhesiveness is maintained even under severe conditions such as immersion in hot water.

SUMMARY OF INVENTION

This invention relates to a curable organopolysiloxane composition comprising from 1 to 75 weight % of a calcium carbonate powder whose surface has been treated with both (a) a rosin or a rosin derivative and (b) a fatty acid or a fatty acid derivative.

DETAILED DESCRIPTION OF THE INVENTION

The calcium carbonate powder used by the present invention functions to improve the adherence to substrates, such as glasses, plastics, and metals, with which the instant composition is in contact during cure of the composition. This calcium carbonate powder functions to prevent a loss of adherence under severe conditions, such as immersion in hot water. The calcium carbonate powder according to the invention is a calcium carbonate powder whose surface has been treated with both (a) a rosin or a rosin derivative and (b) a fatty acid or a fatty acid derivative. The rosin and rosin derivatives constituting component (a) can be exemplified by cyclic diterpene acids (e.g., abietic acid and pimaric acid) making up the resin acids that are the chief constituents of rosin; by the disproportionated rosin afforded by adding hydrochloric acid to the aforesaid cyclic diterpene acids and effecting isomerization by heating; by the hydrogenated rosin afforded by the addition of hydrogen to the aforesaid cyclic diterpene acids; by the polymerized rosins afforded by the polymerization of the aforesaid cyclic diterpene acids; by ester compounds of the aforesaid cyclic diterpene acids, such as their methyl, ethyl, propyl, isopropyl, butyl, sec-butyl, and tert-butyl esters; and by the alkali metal and alkaline-earth metal salts of the aforesaid cyclic diterpene acids. Among these, modified rosins such as disproportionated rosins and hydrogenated rosins are preferred. These modified rosins and rosin derivatives are commercially available and can be readily obtained from commercial sources.

The fatty acids and fatty acid derivatives (b) can be exemplified by capric acid, lauric acid, myristic acid, palmitic acid, stearic acid, oleic acid, linolic acid, cerotic acid, behenic acid, elaidic acid, arachidic acid, and their alkali metal and alkaline-earth metal salts. Among these, the $C_6$ to $C_{31}$ fatty acids and their alkali metal and alkaline-earth metal salts are particularly preferred.

The component (a) (rosin or rosin derivative):component (b) (fatty acid or fatty acid derivative) weight ratio used to treat the surface of the calcium carbonate powder is preferably 1:9 to 9:1 and more preferably 1:7 to 1:1.

The particle size of the calcium carbonate powder preferably corresponds to a BET specific surface area of at least 5 $m^2/g$. This calcium carbonate powder must occupy from 1 to 75 weight % of the curable organopolysiloxane composition and more preferably occupies from 33 to 50 weight %. The cured product will manifest poor mechanical strength at less than 1 weight % calcium carbonate powder, while amounts in excess of 75 weight % cause reduced handling properties.

The composition of to the present invention is a curable organopolysiloxane composition comprising from 1 to 75 weight % of the above-described calcium carbonate powder. The curable organopolysiloxane composition used for the present purposes can be the heretofore known curable organopolysiloxane compositions whose base component is crosslinkable organopolysiloxane. These curable organopolysiloxane compositions can be exemplified by addition-curing organopolysiloxane compositions whose base components are vinyl-functional diorganopolysiloxane, SiH-functional organohydrogenpolysiloxane, and platinum catalyst; alcohol-eliminating condensation-curing organopolysiloxane compositions whose base components are hydroxyl-endblocked diorganopolysiloxane or alkoxy-endblocked diorganopolysiloxane, alkoxy-functional silane or siloxane oligomer, and a condensation reaction catalyst; alcohol-eliminating condensation-curing organopolysiloxane compositions whose base components are diorganopolysiloxane having alkoxy bonded to silicon across alkylene at both molecular chain terminals, alkoxy-functional silane or siloxane oligomer, and a condensation reaction catalyst; oxime-eliminating condensation-curing organopolysiloxane compositions whose base components are hydroxyl-endblocked diorganopolysiloxane, oxime-functional silane, and a condensation reaction catalyst; acetone-eliminating condensation-curing organopolysiloxane compositions whose base components are hydroxyl-endblocked diorganopolysiloxane, isopropenoxy-functional silane, and a condensation reaction catalyst; hydroxylamine-eliminating condensation-curing organopolysiloxane compositions whose base components are hydroxyl-endblocked diorganopolysiloxane, aminoxy-functional organopolysiloxane, and a condensation reaction catalyst; organoperoxide-curing organopolysiloxane compositions whose base components are vinyl-functional organopolysiloxane and organoperoxide; and ultraviolet-curing organopolysiloxane compositions that cure upon exposure to ultraviolet radiation.

The composition according to the present invention is in its most general embodiment a curable organopolysiloxane composition that contains from 1 to 75 weight % of the above-described calcium carbonate powder. In a preferred embodiment the composition according to the present invention also contains from 0.05 to 10 weight % of a silicon-containing adhesion promoter. This silicon-containing adhesion promoter can be exemplified by amino-functional organic group-containing alkoxysilanes such as aminomethyltriethoxysilane, 3-aminopropyltriethoxysilane, 3-aminopropylmethyldimethoxysilane, N-(2-aminoethyl) aminomethyltributoxysilane, N-(2-aminoethyl)-3-aminopropyltrimethoxysilane, N-(2-aminoethyl)-3-aminopropylmethyldimethoxysilane, and 3-anilinopropyltriethoxysilane; epoxy-functional organosilanes such as 3-glycidoxypropyltrimethoxysilane, 3-glycidoxypropylmethyldimethoxysilane, 2-(3,4-epoxycyclohexyl)ethyltrimethoxysilane, and 2-(3,4-epoxycyclohexyl)ethylmethyldimethoxysilane; alkenyl-functional organic group-containing alkoxysilanes such as vinyltrimethoxysilane, allyltrimethoxysilane, and gamma-methacryloxypropyltrimethoxysilane; epoxy- and vinyl-functional organosiloxane oligomers; epoxy- and SiH-functional organosiloxane oligomers; and reaction mixtures of an amino-functional organic group-containing organosilane and an epoxy-functional organic group-containing organosilane.

While the composition according to the present invention in general comprises curable compositions constituted as described above, a preferred composition is the curable organopolysiloxane composition comprising (A) 100 weight parts of a diorganopolysiloxane whose molecular chain terminals are endblocked by a silicon-bonded hydroxyl or a silicon-bonded alkoxy;

(B) 1 to 300 weight parts of a calcium carbonate powder whose surface has been treated with (a) a rosin or a rosin derivative and (b) a fatty acid or a fatty acid derivative;

(C) 0.5 to 30 weight parts of an organosilicon compound that contains at least 3 silicon-bonded alkoxy groups in each molecule; and (D) 0.001 to 10 weight parts of a condensation reaction catalyst.

Another preferred composition comprises the above-described preferred curable organopolysiloxane composition that also comprises, per 100 weight parts component (A), from 0.5 to 30 weight parts of (E) a reaction mixture of an amino-functional organic group-containing alkoxysilane and an epoxy-functional organic group-containing alkoxysilane.

The diorganopolysiloxane (A) is the base component of these compositions and must have molecular chain terminals endblocked by hydroxyl or alkoxy. Since excessively low viscosities for component (A) result in a poor post-cure rubber elasticity and excessively high viscosities cause an impaired processability, the viscosity of component (A) at 25° C. must be from 20 to 1,000,000 centistokes and is preferably from 100 to 100,000 centistokes. This organopolysiloxane should have a substantially straight-chain molecular structure, although a small amount of branching in a portion of the molecular chain is acceptable. The silicon-bonded organic groups in this organopolysiloxane can be exemplified by alkyl groups such as methyl, ethyl, propyl, butyl, and octyl; alkenyl groups such as vinyl, allyl, and hexenyl; aryl groups such as phenyl and tolyl; haloalkyl groups such as 3,3,3-trifluoropropyl and 3-chloropropyl; and the 3-cyanoalkyl group. The organopolysiloxane unit constituting the main skeleton of the subject diorganopolysiloxane can be exemplified by the dimethylpolysiloxane unit, the methylethylpolysiloxane unit, the methyloctylpolysiloxane unit, the methylvinylpolysiloxane unit, the methylphenylpolysiloxane unit, the methyl(3,3,3-trifluoropropyl) polysiloxane unit, the dimethylsiloxane-methylphenylsiloxane copolymer unit, and the dimethylsiloxane-methyl(3,3,3-trifluoropropyl)siloxane copolymer unit.

The molecular chain terminals of the subject organopolysiloxane should be endblocked by silicon-bonded hydroxyl or silicon-bonded alkoxy. Examples of the silicon-bonded hydroxyl molecular chain terminals are the dimethylhydroxysiloxy group and methylphenylhydroxysiloxy group. Examples of the silicon-bonded alkoxy molecular chain terminations are the vinyldimethoxysiloxy group, methyldimethoxysiloxy group, trimethoxysiloxy group, methyldiethoxysiloxy group, and triethoxysiloxy group.

The calcium carbonate powder (B) functions to provide the cured product from the subject composition with good mechanical properties and in particular to impart thereto adhesiveness under severe conditions, such as immersion in hot water. The calcium carbonate powder (B) can be exemplified by the calcium carbonate powder already discussed above. Component (B) should be added from 1 to 300 weight parts, preferably from 10 to 200 weight parts, and more preferably from 50 to 100 weight parts, in each case per 100 weight parts component (A).

The organosilicon compound (C) functions to crosslink component (A) and thereby cure the subject composition and must contain at least 3 silicon-bonded alkoxy groups in each molecule. Component (C) can be exemplified by alkyl silicates such as methyl silicate, ethyl silicate, methyl Cellosolve orthosilicate, and n-propyl orthosilicate, and by silyl compounds such as methyltrimethoxysilane, ethyltrimethoxysilane, methyltriethoxysilane, hexamethoxydisilylpropane, and hexamethoxydisilylheptane.

Component (C) should be added in amounts from 0.5 to 30 weight parts and preferably in amounts from 1 to 10 weight parts, in each case per 100 weight parts component (A). The use of less than 0.5 weight part component (C) results in problems with the cured product such as impaired mechanical properties and the failure to manifest satisfactory adhesive properties. The use of more than 30 weight parts component (C) causes such problems as an extremely slow cure rate by the resulting composition and a tendency for the cured product to be very hard.

The curing catalyst (D) can be exemplified by the carboxylic acid salts of metals such as tin, titanium, zirconium, iron, antimony, bismuth, and manganese; organotitanate esters; and organotitanium chelate compounds. Component (D) can be more specifically exemplified by tin compounds such as dibutyltin dilaurate, dibutyltin dioctoate, dioctyltin dilaurate, dibutyltin maleate ester, and stannous octoate, and by titanium compounds such as tetrabutyl titanate, diisopropoxybis(acetylacetonate)titanium, and diisopropoxybis(ethyl acetoacetate)titanium.

Component (D) should be added at from 0.001 to 10 weight parts and preferably at from 0.01 to 5 weight parts, in each case per 100 weight parts component (A). An addition of component (D) below the lower limit of the given range results in a tendency for the corresponding composition to have a very slow cure rate, while an addition of component (D) in excess of the upper limit of the given range results in a very fast cure rate for the corresponding composition and hence in impaired handling properties.

Component (E) is the reaction mixture of an amino-functional organic group-containing alkoxysilane and an epoxy-functional organic group-containing alkoxysilane, and its addition is preferred for the purpose of generating additional improvements in the adhesive performance of the above-described condensation-curing organopolysiloxane composition. Although component (E) does function as a crosslinker for the composition under consideration, this component also functions to generate additional improvements in adhesiveness for the particular substrate with which the composition is in contact during cure of the composition. In particular, through its co-use with component (B), component (E) functions to improve the durability of adhesion by the cured product from the subject composition under severe conditions, such as immersion in hot water. The amino-functional organic group-containing alkoxysilane encompassed by component (E) can be exemplified by aminomethyltriethoxysilane, 3-aminopropyltriethoxysilane, 3-aminopropylmethyldimethoxysilane, N-(2-aminoethyl)-3-aminomethyltributoxysilane, N-(2-aminoethyl)-3-aminopropyltrimethoxysilane, N-(2-aminoethyl)-3-aminopropylmethyldimethoxysilane, and 3-anilinopropyltriethoxysilane. The epoxy-functional organic group-containing alkoxysilane can be exemplified by epoxyalkylorganoalkoxysilanes such as 3-glycidoxypropyltrimethoxysilane, 3-glycidoxypropylmethyldimethoxysilane, 2-(3,4-epoxycyclohexyl)ethyltrimethoxysilane, and 2-(3,4-epoxycyclohexyl)ethylmethyldimethoxysilane. The molar ratio of the amino-functional organic group-containing alkoxysilane to the epoxy-functional organic group-containing alkoxysilane, is preferably in the range from 1:1.5 to 1:5 and more preferably in the range from 1:2 to 1:4. Component (E) is readily synthesized by mixing and reacting the two silanes with each other at room or elevated temperature.

While the subject compositions comprise the components (A) to (D) or (A) to (E) as described above, they may also optionally contain, insofar as the object of the invention is not impaired, organic solvent, trimethylsiloxy-endblocked diorganopolysiloxane, flame retardant, plasticizer, thixotropy agent, colorant, the usual adhesion promoters, and antimold compound.

The curable organopolysiloxane composition according to the present invention as described hereinabove forms a cured product that exhibits an excellent mechanical strength and that is highly adhesive to various substrates, such as glasses, metals, and plastics. More particularly, this cured product develops a strongly durable adhesiveness, and can maintain its adhesiveness even during use in severe ambients, such as immersion in hot water. The composition according to the present invention is therefore well suited for use in applications where such characteristics are critical, for example, as a waterproofing sealant in civil engineering and building structures.

EXAMPLES

The invention will be explained in greater detail in the following working examples. The viscosity values reported in the examples were measured at 25° C. The following abbreviations are used in the examples: % for percent, T. max (kgf/cm$^2$) for maximum tensile stress, E. max (%) for the elongation at maximum load, E. br (%) for the elongation at break, tCF (%) for the proportion of partial cohesive failure, CF (%) for the proportion of cohesive failure, and AF (%) for the proportion of interfacial delamination.

Example 1

90 weight parts calcium carbonate powder (BET specific surface area=30 m$^2$/g) whose surface had been treated with rosin and lauric acid (rosin:lauric acid weight ratio=50:50) was mixed to homogeneity into 100 weight parts hydroxyl-endblocked polydimethylsiloxane with a viscosity of 15,000 centistokes to yield a mixture designated hereinafter as the organopolysiloxane base. The calcium carbonate powder used here was prepared by slurrying 100 weight parts of the calcium carbonate powder in water, adding; a mixture of 5 weight parts rosin and 5 weight parts lauric acid with mixing, and then carrying out dehydration and deliquefying.

A mixture hereinafter designated as the catalyst was also prepared by mixing the following to homogeneity into 52 weight parts hydroxyl-endblocked polydimethylsiloxane with a viscosity of 15,000 centistokes: 18 weight parts carbon black, 9 weight parts n-propyl orthosilicate, 12 weight parts of a reaction mixture from 3-aminopropyltriethoxysilane and 3-glycidoxypropyltrimethoxysilane where the 3-aminopropyltriethoxysilane:3-glycidoxypropyltrimethoxysilane molar ratio=1:2,9 weight parts 1,2-bis(triethoxysilyl)ethane, and 1 weight part dibutyltin dilaurate.

A room temperature-curable organopolysiloxane composition was then prepared by mixing 100 weight parts of the organopolysiloxane base with 100 weight parts of the catalyst to homogeneity. The resulting composition was filled between a sheet of heat-reflecting glass (SGY32 from Asahi Glass Co., Ltd.) and a sheet of float glass (from Nippon Test Panel Kogyo Co., Ltd.) and tensile adhesion test specimens as specified in JIS A 5758 were fabricated. Each tensile adhesion test specimen was cured for 1, 3, or 7 days at 25° C./50% humidity in order to cure the room temperature-curable organopolysiloxane composition. The resulting tensile adhesion test specimens were then submitted to tensile testing in order to measure the adhesive strength of the cured product for the substrate. The results are reported in Table 1.

The resulting composition was also filled between 2 sheets of float glass (from Nippon Test Panel Kogyo Co., Ltd.) and tensile adhesive test specimens as specified in JIS A 5758 were fabricated. In one test protocol, the tensile adhesive test specimen was cured for 14 days at 25° C./55% humidity in order to cure the room temperature-curable organopolysiloxane composition and the resulting test specimen was then submitted to tensile testing in order to measure the initial adhesive strength of the cured product for float glass. In a second test protocol, a tensile adhesive test specimen was cured for 14 days at 25° C./55% humidity in order to cure the room temperature-curable organopolysiloxane composition, then immersed for 14 days in hot water at 80° C., and thereafter submitted to tensile testing in order to measure the adhesive strength of the cured product for float glass. These results are reported in Table 2.

Comparative Example 1

A room temperature-curable organopolysiloxane composition was prepared as in Example 1, but in this case using calcium carbonate powder whose surface had been treated with only lauric acid in place of the calcium carbonate powder used in Example 1 whose surface had been treated with both rosin and lauric acid. The surface-treated calcium carbonate used in this comparative example was prepared by slurrying 100 weight parts of the calcium carbonate powder in water, adding 10 weight parts lauric acid with mixing, and then carrying out dehydration and deliquefying. The properties of this composition were measured as in Example 1, and the results are reported in Tables 1 and. 2.

Comparative Example 2

A room temperature-curable organopolysiloxane composition was prepared as in Example 1, but in this case using calcium carbonate powder whose surface had been treated with only rosin in place of the calcium carbonate powder used in Example 1 whose surface had been treated with both rosin and lauric acid. The surface-treated calcium carbonate used in this comparative example was prepared by slurrying 100 weight parts of the calcium carbonate powder in water, adding 10 weight parts rosin with mixing, and then carrying out dehydration and deliquefying. The properties of this composition were measured as in Example 1, and the results are reported in Tables 1 and 2.

TABLE 1

Results for Adhesion Testing

| | no. of days curing (25° C., 55% RH) | modulus | | maximum values | | at break | failure mode | | |
|---|---|---|---|---|---|---|---|---|---|
| | | 10% kgf/cm$^2$ | 50% kgf/cm$^2$ | T. max kgf/cm$^2$ | E. max % | E. br. % | CF % | tCF % | AF % |
| Ex. 1 | 1 day | 0.6 | 1.4 | 9.9 | 785 | 786 | 0 | 100 | 0 |
| | 3 days | 1.2 | 2.8 | 15.3 | 616 | 634 | 100 | 0 | 0 |
| | 7 days | 1.6 | 3.9 | 14.1 | 348 | 348 | 100 | 0 | 0 |
| Comp. Ex. 1 | 1 day | 1.0 | 2.5 | 10.2 | 430 | 431 | 0 | 100 | 0 |
| | 3 days | 1.6 | 4.2 | 16.4 | 413 | 468 | 100 | 0 | 0 |
| | 7 days | 1.9 | 5.1 | 17.1 | 350 | 399 | 100 | 0 | 0 |
| Comp. Ex. 2 | 1 day | 1.0 | 3.2 | 3.9 | 86 | 113 | 0 | 0 | 100 |
| | 3 days | 1.6 | 3.7 | 5.7 | 131 | 139 | 10 | 40 | 50 |
| | 7 days | 2.2 | 5.1 | 8.8 | 158 | 209 | 45 | 55 | 0 |

TABLE 2

Results for Hot Water (80° C.) Testing

| | no. of days of immersion in hot water at 80° C. | modulus | | maximum values | | at break | failure mode | | |
|---|---|---|---|---|---|---|---|---|---|
| | | 10% kgf/cm$^2$ | 50% kgf/cm$^2$ | T. max kgf/cm$^2$ | E. max % | E. br. % | CF % | tCF % | AF % |
| Ex. 1 | initial | 2.2 | 5.5 | 14.0 | 198 | 198 | 100 | 0 | 0 |
| | 14 days | 2.5 | 5.3 | 11.7 | 208 | 226 | 0 | 100 | 0 |
| Comp. Ex. 1 | initial | 2.0 | 4.9 | 16.0 | 370 | 378 | 100 | 0 | 0 |
| | 14 days | 2.0 | — | 3.7 | 46 | 49 | 0 | 0 | 100 |
| Comp. Ex. 2 | initial | 1.7 | 5.8 | 14.8 | 255 | 267 | 100 | 0 | 0 |
| | 14 days | 1.8 | 4.3 | 11.6 | 278 | 280 | 100 | 0 | 0 |

The curable organopolysiloxane composition according to the present invention, because it contains from 1 to 75 weight % of a calcium carbonate powder whose surface has been treated with both (a) a rosin or a rosin derivative and (b) a fatty acid or a fatty acid derivative, gives a cured product that is strongly adhesive to various substrates, such as glasses, plastics, and metals, and that also has a very durable adhesion as evidenced by the ability to maintain adhesion even when used under severe conditions such as immersion in hot water.

We claim:

1. A curable organopolysiloxane composition comprising from 1 to 75 weight % of a calcium carbonate powder whose surface has been treated with both (a) a rosin or a rosin, derivative and (b) a fatty acid or a fatty acid derivative.

2. The curable organopolysiloxane composition described in claim 1, further comprising from 0.05 to 10 weight % (c) a silicon-containing adhesion promoter.

3. The curable organopolysiloxane composition described in claim 1, in which component (a) is a compound selected from the group consisting of rosin acids, disproportionated rosin, hydrogenated rosin, and polymerized rosin.

4. The curable organopolysiloxane composition described in claim 1, in which component (b) is a $C_6$ to $C_{31}$ fatty acid or a metal salt thereof.

5. The curable organopolysiloxane composition described in claim 1, in which component (a) and component (b) have a weight ratio of 1:9 to 9:1.

6. The curable organopolysiloxane composition described in claim 1, in which the curable organopolysiloxane composition is a condensation reaction-curing organopolysiloxane composition.

7. The curable organopolysiloxane composition described in claim 6, in which the condensation reaction-curing organopolysiloxane composition comprises (A) 100 weight parts of a diorganopolysiloxane whose molecular chain terminals are endblocked by a silicon-bonded hydroxyl or a silicon-bonded alkoxy;

(B) 1 to 300 weight parts of a calcium carbonate powder with a BET specific surface area of at least 5 m$^2$/g whose surface has been treated with both (a) a rosin or a rosin derivative and (b) a fatty acid or a fatty acid derivative;

(C) 0.5 to 30 weight parts of an organosilicon compound that contains at least 3 silicon-bonded alkoxy groups in each molecule; and (D) 0.001 to 10 weight parts of a curing catalyst.

8. The curable organopolysiloxane composition described in claim 6, in which the condensation reaction-curing organopolysiloxane composition comprises (A) 100 weight parts of an organopolysiloxane that has a viscosity at 25° C. of 20 to 1,000,000 centistokes and whose molecular chain terminals are endblocked by a silicon-bonded hydroxyl or a silicon-bonded alkoxy;

(B) 1 to 300 weight parts of a calcium carbonate powder with a BET specific surface area of at least 5 $m^2/g$ whose surface has been treated with both (a) a rosin or a rosin derivative and (b) a fatty acid or a fatty acid derivative;

(C) 0.5 to 30 weight parts of an organosilicon compound that contains at least 3 silicon-bonded alkoxy groups in each molecule;

(D) 0.001 to 10 weight parts of a curing catalyst; and (E) 0.5 to 30 weight parts of a reaction mixture of an amino-functional organic group-containing alkoxysilane and an epoxy-functional organic group-containing alkoxysilane.

* * * * *